United States Patent [19]

Hellbergh

[11] Patent Number: 5,427,000
[45] Date of Patent: Jun. 27, 1995

[54] CUTTING ELEMENT, CUTTING EDGE AND METHOD OF MAKING CUTTING EDGES

[75] Inventor: Hakan Hellbergh, Branford, Conn.

[73] Assignee: Sandvik Milford Corp., Branford, Conn.

[21] Appl. No.: 53,694

[22] Filed: Apr. 29, 1993

[51] Int. Cl.$^6$ .............................................. B23D 63/12
[52] U.S. Cl. ........................................ 76/112; 76/116
[58] Field of Search .................... 76/101.1, 104.1, 112, 76/115, 116, DIG. 6, DIG. 10; 83/661, 835; 419/41

[56] References Cited

U.S. PATENT DOCUMENTS

| | | | |
|---|---|---|---|
| 3,104,562 | 9/1963 | Kolesh | 76/112 |
| 3,788,182 | 1/1974 | Tyler | 76/112 |
| 3,800,633 | 4/1974 | Funakubo | 76/112 |
| 4,618,540 | 10/1986 | von Holst et al. | 419/41 |
| 4,698,205 | 10/1987 | Oskarsson et al. | 76/108.1 |
| 4,784,033 | 11/1988 | Hayden et al. | 76/112 |
| 4,849,300 | 7/1989 | Eriksson et al. | 428/558 |
| 4,869,974 | 9/1989 | Oskarsson et al. | 428/328 |

FOREIGN PATENT DOCUMENTS 7127372  3/1972  Germany .

*Primary Examiner*—Hwei Siu Payer
*Attorney, Agent, or Firm*—Burns, Doane, Swecker & Mathis

[57] ABSTRACT

A cutting element, cutting edge and method of making cutting edges is disclosed. A compound material, preferably containing 30–70 vol % of carbides, nitrides and/or carbonitfides, is co-extruded with a steel cover. The co-extended product is cut into tip blanks whose outer surface corresponds to surfaces of a cutting element body. The steel cover is brazed to corresponding contact surfaces on bodies of a cutting element, e.g., a saw blade, and the cutting edges are ground by removing portions of the steel cover and the compound material.

7 Claims, 1 Drawing Sheet

CUTTING ELEMENT, CUTTING EDGE AND METHOD OF MAKING CUTTING EDGES

BACKGROUND OF THE PRESENT INVENTION

It is known from the U.S. Pat. No. 4,849,300 to make tools from hard compound materials containing 30–70 vol % of hard constituents in the form of carbides, nitfides and/or carbonitrides of Ti, Zr, Hf, V, Nb, Ta, Cr, Mo and/or W in a matrix based on Fe, Ni and/or Co, said hard constituents forming a core which is co-extruded with a metallic cover such as tool steel. The cover is either removed before the final shaping or retained as a major supporting part of the tool.

In certain applications such as band saws or large circular saws the required volume fraction of hard constituents is so small and the technical demands on the supporting parts of the tool so specialized that it is not economically feasible to produce the whole tool by co-extrusion as described in the aforementioned patent.

It is known to make saw blades with tips made of hard material such as cemented carbide with cobalt matrix, either as comparatively large prismatic tips brazed to the tooth bodies according to patent U.S. Pat. No. 4,784,033, or as small spheres brazed or welded to the tooth bodies according to U.S. Pat. No. 3,104,562 or as small cylindrical parts welded to the tooth bodies according to patent publication DE G 71 27372.

The above hard compound materials are, especially when the titanium nitfide content is high, difficult or impossible to braze since they are not wetted by the brazing alloy, and not possible to weld because they are not stable at welding temperatures. The invention concerns a new saw tooth design which allows brazing of tips of hard compound materials using normal brazing alloys.

SUMMARY OF THE PRESENT INVENTION

During co-extrusion of the compound material and the steel cover, the cover has the purpose of eliminating the risk of surface cracking, and for this purpose a cover thickness of at least 4% of the diameter is needed. As long as the steel cover remains, it is possible to deform the compound material plastically in spite of the large content of hard constituents, through repeated extrusion or rolling.

According to the invention a bar of the compound material with a steel cover is plastically reduced to a diameter corresponding to the size of the tooth or cuffing edge tip and cut into short tip blanks. The body of the saw blade or the cuffing element is shaped for close contact with the steel cover, and the steel covers of the tip blanks are brazed to the bodies. The tip blanks are ground to the final shape of the teeth with the final cutting edges formed entirely in the compound material.

BRIEF DESCRIPTION OF THE DRAWING FIGURES

The present invention will be described with reference to the drawing figures, wherein like members bear like reference numerals, and wherein:

FIG. 1 is a side view of a saw tooth as assembled with the finished product being illustrated in broken lines; and FIG. 2 is a side view of the tool body with the finished cutting edge.

DETAILED DESCRIPTION OF THE PREFERRED EMBODIMENTS

The present invention will be described with reference to the presently preferred embodiment of a saw blade and teeth therefore, it is to be understood that the present invention is applicable to any cutting tool in which a hard compound material cutting tip is desirable.

Figure 1:
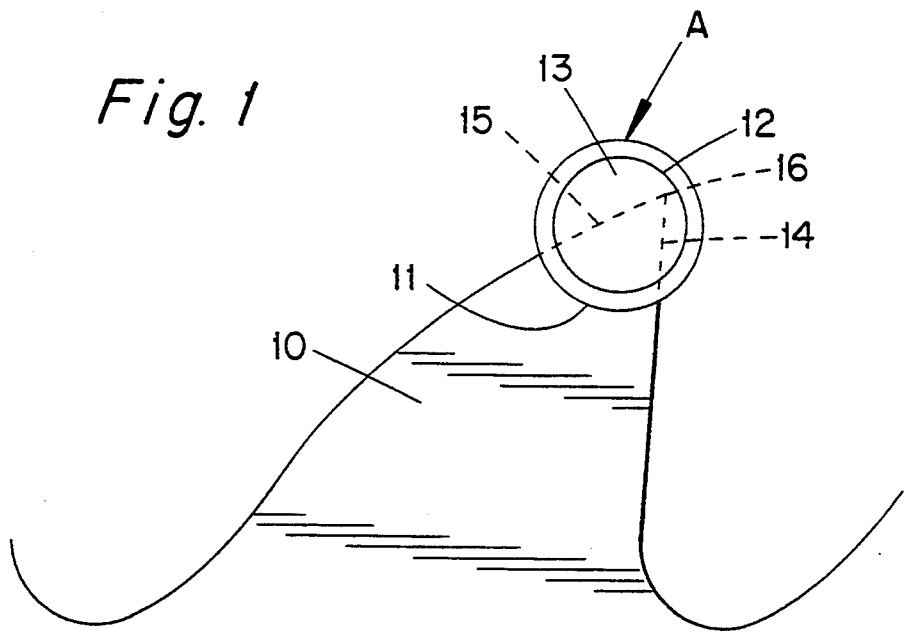

With reference to FIG. 1, a saw tooth comprising a tooth body 10 is provided with a curved contact surface 11 closely conforming to the steel cover 12 of a tip blank. The tip blank A is formed as a short cylindrical piece with a core of compound material 13 and a steel cover 12. The exterior surface of steel cover 12 and the curved contact surface on the tooth body 10 are formed with correspondingly shaped surfaces. These surfaces need not be cylindrical but may be of any complimentary shape. In addition, the cylindrical piece of the tip blank A can be separated into individual segments (e.g., into quarters) with each segment containing sufficient portion of the cover 12 so that it can be secured to the tooth body. In this way, a co-extruded cylindrical tip blank can be used to provide four (4) or more individual teeth.

Figure 2:
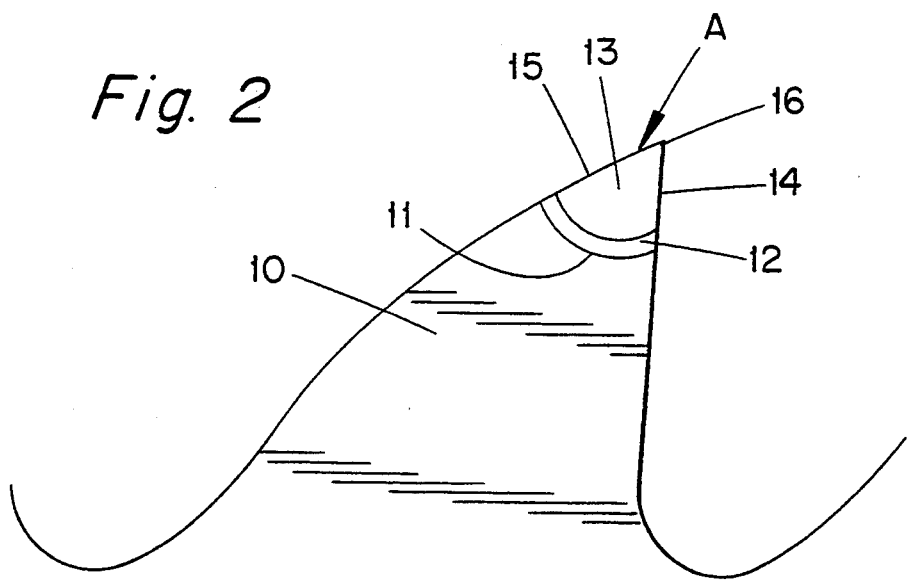

The tip blank A is secured, preferably by brazing, to the contact surface 11 with a braze alloy preferably based on silver or copper. After brazing, the rake face 14 and a clearance face 15 are ground by removing portions of the steel cover 12 and selected portions of the compound material to create a sharp cutting edge 16 in compound material (see FIG. 2). The tip blank may also be secured to the tooth body by other means e.g., electric or resistance welding in appropriate circumstances.

The lateral faces of the tooth tips may be ground, if this is needed, to conform the edges of the tooth tips to the sides of the tooth body and to provide radial and lateral clearance. The saw teeth formed by the present invention can be made without setting, with tooth tips wider than the saw blade width, or with setting and a tooth tip width equal to the saw blade width. In the latter case, it may be necessary to exercise some care so that the force during setting is applied to the tooth body 10 and not to the compound material 13.

The curvature of the contact surface 11 and the complimentary, preferably corresponding curved surfaces of the steel cover 12 assure a beneficial stress distribution in the braze joint with this configuration, since the cutting forces cause mainly compressive stresses. In contrast, a configuration with planar contact surfaces would be subjected to larger shear stresses which could cause the tip blank to separate from the tooth body. Since the brazed joint only touches the steel cover 12 and the tooth body 10 (and not the compound material 13), the braze is easier to effect and stronger because there is complete wetting in the joint providing for maximum strength. The joint may be further enhanced by providing a filler material, known in art, between the cover and the tooth body. The compound material is secured to the cover due to the co-extrusion of the material, and the subsequent working of the co-extruded material.

By creating the cutting edge 16 (FIG. 2) by grinding after securement of the tip, one can avoid edge defects caused by handling of the tip blanks.

Examples of dimensions which might be used for a saw blade application are a bar reduced to 5 mm diameter (0.2") including a steel cover of 0.4 mm thickness (0.016") and cut into tip blanks of 3 mm length (0.12").

The edge 16 can be ground to many known shapes, comprising one or more straight portions, and two adjoining teeth need not have the same edge shape. Especially for sawing of metal, it is suitable to make triple chip teeth, with every second tooth having a higher central edge part and every other second tooth having a lower edge with more even height.

The saw tooth can be applied to band saws, circular saws, other rotary or reciprocating saws or to tool segments which can be mounted on a rotary hub or used separately. In addition, the tooth or cutting tip could be provided on a cutoff tool, milling tool, turning tool, parting tool, drills, end mills, threading tools, slotting tools, or the like.

The principles, preferred embodiments and mode of operation have been described in the foregoing. Variations and changes may be made by others without departing from the scope of the present invention as defined in the claims.

I claim:

1. Method of making cutting edges, comprising the steps of co-extruding a compound material with a steel cover, cutting the co-extruded material into tip blanks, securing the steel cover of the blanks to contact surfaces on a body, said contact surfaces conforming to the shape of the steel cover, and grinding portions of the steel cover and the compound material to form the cutting edges.

2. The method according to claim 1, wherein the step of grinding comprises forming the cutting edges solely formed from the compound material.

3. The method according to claim 1, wherein the step of grinding comprises forming the cutting edges as saw teeth.

4. The method according to claim 1, further comprising the step of separating the co-extruded compound material and steel cover into individual pie-shaped segments each forming a portion of a respective cutting edge.

5. The method of making cutting edges, according to claim 1, wherein the step of securing the co-extruded material to the body is accomplished by brazing.

6. The method of making cutting edges, according to claim 1, further comprising the step of providing a filler material between the steel cover and the contact surfaces on the body.

7. The method according to claim 1, wherein the step of co-extruding comprises forming the tip blanks as cylindrical.

* * * * *